United States Patent [19]

Kawamura et al.

[11] Patent Number: 4,667,228

[45] Date of Patent: May 19, 1987

[54] IMAGE SIGNAL PROCESSING APPARATUS

[75] Inventors: Hideaki Kawamura; Takashi Sasaki, both of Tokyo; Nobuaki Sakurada, Yokohama, all of Japan

[73] Assignee: Canon Kabushiki Kaisha, Tokyo, Japan

[21] Appl. No.: 659,948

[22] Filed: Oct. 11, 1984

[30] Foreign Application Priority Data

| Oct. 14, 1983 [JP] | Japan | 58-193128 |
| Oct. 14, 1983 [JP] | Japan | 58-193129 |
| Oct. 19, 1983 [JP] | Japan | 58-195508 |
| Oct. 19, 1983 [JP] | Japan | 58-195509 |

[51] Int. Cl.$^4$ .................. H04N 1/387; H04N 5/202
[52] U.S. Cl. .................................. 358/80; 358/32
[58] Field of Search ............... 358/80, 75, 78, 32

[56] References Cited

U.S. PATENT DOCUMENTS

| 4,335,399 | 6/1982 | Matsumoto | 358/80 |
| 4,371,260 | 2/1983 | Yoshimoto et al. | 358/75 |
| 4,410,909 | 10/1983 | Ueda et al. | 358/80 |

Primary Examiner—Michael A. Masinick
Assistant Examiner—Robert M. Bauer
Attorney, Agent, or Firm—Fitzpatrick, Cella, Harper & Scinto

[57] ABSTRACT

An image signal processing apparatus has a color decorder for preparing a histogram for the brightness level of each color signal of an input image signal such as an NTSC signal, and an image process circuit for calculating a cumulative brightness distribution curve of the histogram and for performing gamma-correction of the input image signal in accordance with the cumulative brightness distribution curve. A CPU in the image process circuit can calculate upper and/or lower extremities of each cumulative distribution curve and perform normalization of each color signal within the range defined by the calculated upper and/or lower extremity.

11 Claims, 28 Drawing Figures

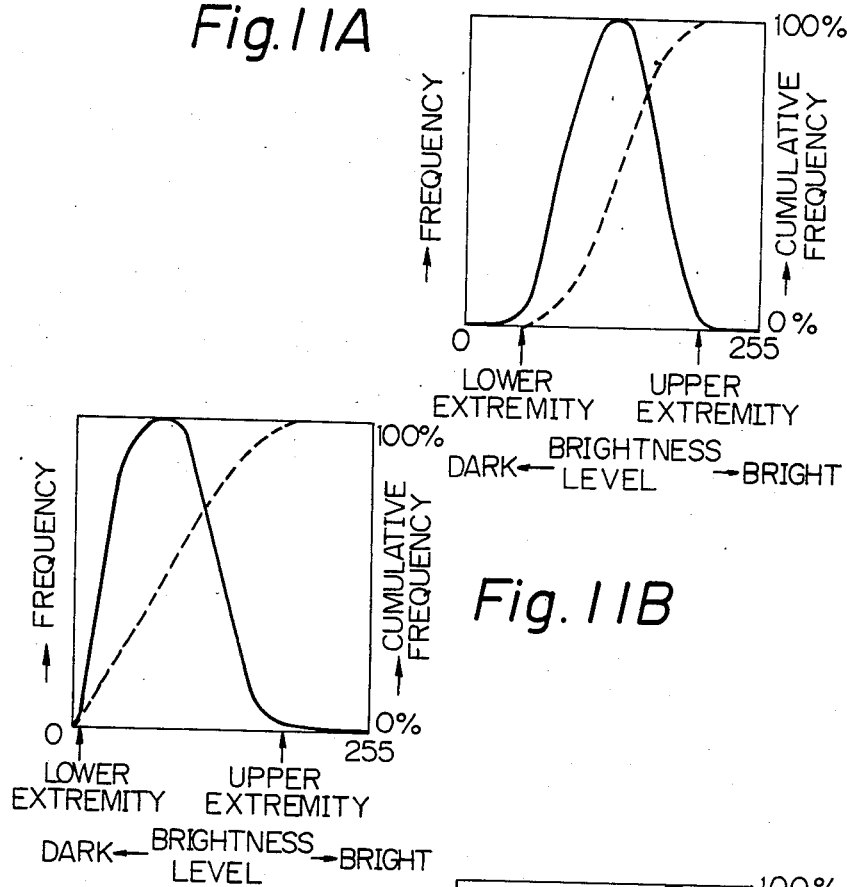
Fig.11A
Fig.11B
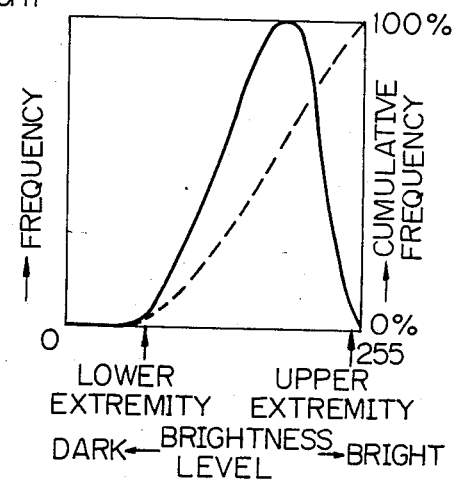
Fig.11C

IMAGE SIGNAL PROCESSING APPARATUS

BACKGROUND OF THE INVENTION

1. Field of the Invention

The present invention relates to an image signal processing apparatus for processing an input image signal in accordance with the characteristics of the signal.

2. Description of the Prior Art

In order to provide gradation or gray levels in a highlight image portion, a halftone image portion and a shadow image portion in a printer or a scanner, it is known to perform input/output conversion in accordance with the gamma-correction curves a, b and c, in FIG. 1, that is, gamma-correction.

In order to provide gray levels for various types of input images, it is essential to obtain an optimal gamma-correction curve suitable for each image. This has required trial and experience.

In a printer producing a hard copy of a color image signal, there is a limit in the density range which allows image reproduction. For this reason, it is preferable to set an upper extremity (upper limit) and/or lower extremity (lower limit) for an input level of an input image signal and to normalize the signal accordingly, and then to process the image signal. However, an input image signal is very rarely distributed uniformly along the entire density range. In general, the brightness distribution of an input image signal is generally concentrated at a dark or bright side. When normalization is performed with a fixed upper extremity and/or a fixed lower extremity, an output image has a poor gray level quality deviating either to the bright or dark side. In view of this, it is preferable to adjust the upper and/or lower extremity in accordance with each input signal. However, when a manual adjusting method using an adjustment volume or the like is used, the output quality depends upon the experience and skill of the operator, and optimal image quality cannot be guaranteed at all times.

SUMMARY OF THE INVENTION

It is an object of the present invention to provide an image signal processing apparatus which can perform automatic and consistent gamma-correction for any type of input signal and which can guarantee an output image with excellent gray level quality without requiring experience or skill on the side of the operator.

It is another object of the present invention to provide an image processing apparatus which performs gamma-correction such that the gray level of a portion of an input signal which has a high frequency in a frequency distribution of brightness level is increased while that of a portion which has a low frequency in this distribution is decreased, thereby producing an output image of excellent gray level quality.

It is still another object of the present invention to provide an image processing apparatus which performs gamma-correction in such a manner that a portion of an input image signal which has a high frequency in a frequency distribution of brightness level for each primary signal R, G or B is increased and a portion which has a low frequency in the frequency distribution is decreased, thereby producing an output image having an excellent gray level quality for each primary signal R, G or B.

It is still another object of the present invention to provide an image signal processing apparatus which allows automatic and consistent setting of an upper and/or lower extremity for normalization of an input image signal, thereby allowing normalization without requiring experience or skill in the operator.

It is still another object of the present invention to provide an image signal processing apparatus which can set an upper and/or lower extremity for each primary signal of an input image signal and can automatically correct color balance for each input image with a color imbalance so that normalization of each color component may not adversely affect the normalization of other color components, thereby allowing production of natural images.

The above and other objects of the present invention will become apparent from the following detailed description of the preferred embodiments and the accompanying drawings.

BRIEF DESCRIPTION OF THE DRAWINGS

FIGS. 11A, 11B and 11C are graphs showing brightness distributions and their cumulative curves when input signals are concentrated at a halftone image portion, a dark image portion and a bright image portion; respectively;

DETAILED DESCRIPTION OF THE PREFERRED EMBODIMENTS

Figure 1:
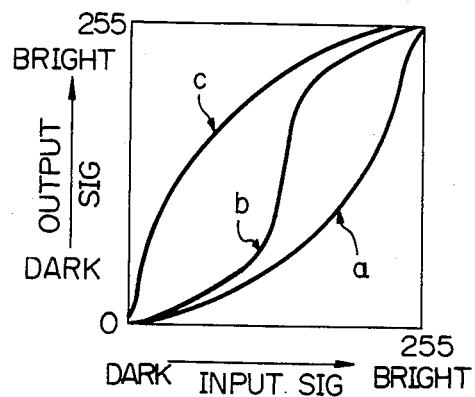
FIG. 1 is a graph showing known gamma-correction curves for image signals.
Figure 2:
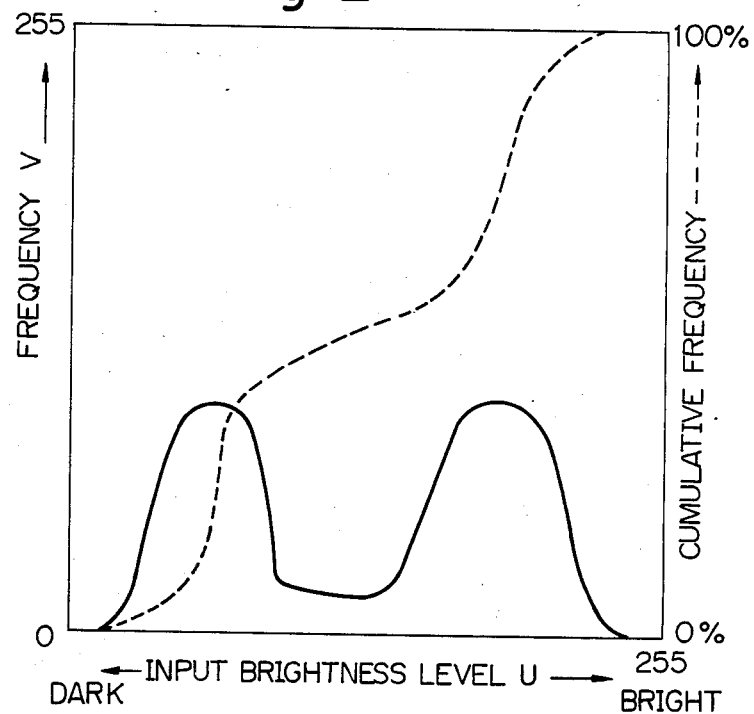
FIG. 2 is a graph showing a histogram and its cumulative curve of brightness level of an input image signal.
Figure 3:
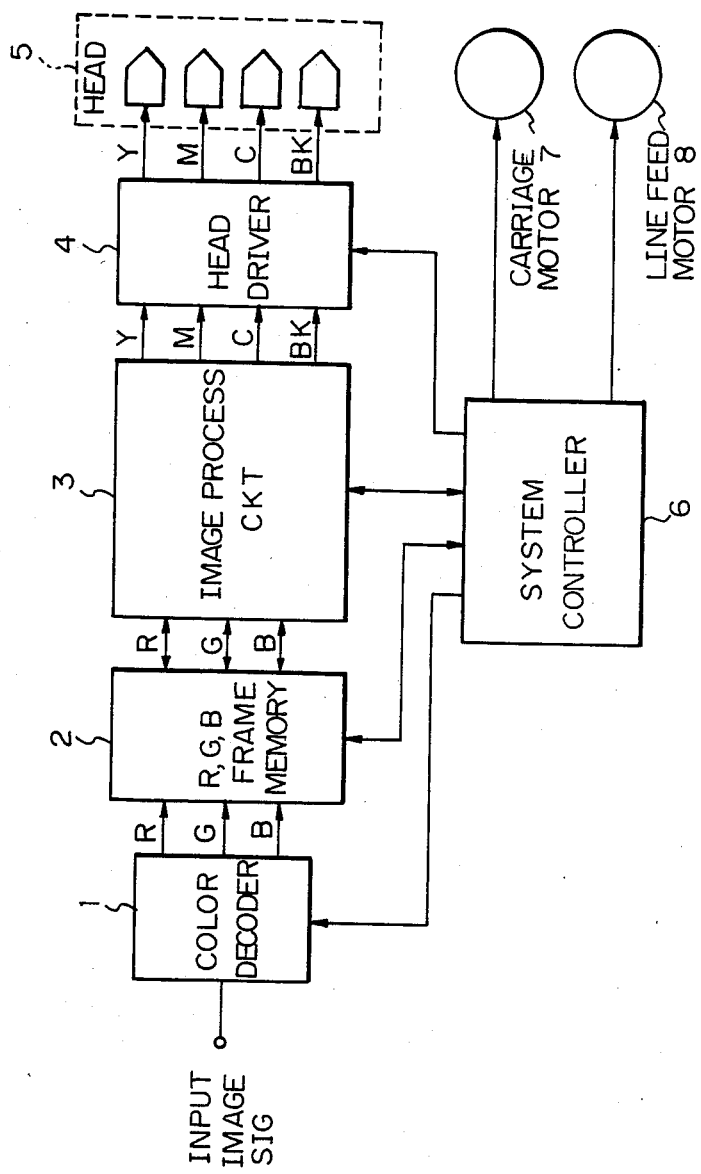
FIG. 3 is a block diagram of an image signal processing apparatus according to a first embodiment of the present invention.

First Embodiment of Image Signal Processing Apparatus (FIGS. 2 and 3)

FIG. 2 shows a frequency distribution (solid line) and its cumulative curve (dotted line) of a brightness level of an input image signal. In this case, the brightness level is digitized in 0 to 255 levels and the frequency distribution is normalized in 0 to 255 levels. The cumulative frequency is represented as a percentage. As can be seen from this graph, in a region of high frequency, the slope of the cumulative curve becomes steep. In a region of low frequency, the slope of the cumulative curve becomes moderate. The present invention utilizes this property and employs this cumulative curve as a gamma-correction curve.

FIG. 3 is a block diagram showing the overall configuration of an image signal processing apparatus according to a first embodiment of the present invention. A color decoder 1 separates an input image signal, for example, an NTSC signal, into three primary signals (additive primaries) of R, G and B (red, green and blue color components). The color decoder 1 records the R, G and B signals of one frame on a medium capable of frame recording, for example, a frame memory 2. Other media may be used in place of the frame memory 2. For example, in the case of analog image recording, laser disk, a video tape or a magnetic disk may be used. In the case of digital recording after A/D conversion, a magnetic disk such as a floppy disk or a magnetic tape may be used. In either case, any medium which allows reproduction of effective pixel data of one frame to an image process circuit 3 can be used. The image process circuit 3 calculates a brightness distribution of data recorded in the frame memory 2, sets or calculates a cumulative brightness distribution curve, and performs gamma-correction in accordance with the cumulative brightness distribution curve. FIGS. 4 to 7 show details of this processing. The processing can be performed by a system controller 6 to be described later instead of by the image process circuit 3. The image process circuit 3 converts the R, G and B signals into primary signals of yellow (Y), magenta (M) and cyan (C) signals by method of subtractive mixture of colors. The image process circuit 3 also prepares a black signal BK by UCR processing and performs masking for eliminating the turbidity of the inks used.

A head driver 4 performs voltage conversion in accordance with density data of the yellow Y, magenta M, cyan C and black BK signals from the image process circuit 3. The converted voltage is applied to a printing head 5.

The system controller 6 performs timing control of a voltage applied to the printing head 5, timing control of the respective units in FIG. 3, and control of a carriage motor 7 for feeding the head and of a line feed motor 8 for feeding a recording medium.

In the apparatus of this configuration, an input image signal is separated into the primary signals R, G and B by the decoder 1. The signals are then converted into digital data of 0 to 255 levels. The digital data is then stored in the frame memory 2. When the digital data is $R=G=B=255$, it indicates white. The larger the value of the digital data, the brighter the corresponding image portion. When the brightness of the input image signal is $Y_T$, it is given, for example, by:

$$Y_T = 0.30R + 0.59G + 0.11B$$

and is a value of 0 to 255 levels. When the brightness level distribution for 640×480 dots of an NTSC signal is calculated for one frame according to the above equation, a histogram as indicated by the solid line in FIG. 2 is obtained. When the histogram for the image data is accumulated, a cumulative brightness distribution curve indicated by the dotted line in FIG. 2 is obtained.

In FIG. 2, the abscissa U of the cumulative brightness distribution curve plots 0 to 255 levels of the input brightness level, and the ordinate V plots 0 to 255 levels of the cumulative frequency. When normalization is performed in this manner, the equation representing this curve is obtained. When this function is represented by $V = F(U)$, V can be calculated as a value which is obtained by gamma-conversion of the input brightness level. In practice, this function as a table is stored in the image process circuit 3 or the system controller 6. An output brightness level can then be calculated referring to this table. Multiplication, addition, table conversion or the like for performing the above-mentioned processing can be easily performed by incorporating an apparatus with a calculation function such as a microcomputer in the image process circuit 3 or the system controller 6.

When an input image signal is printed, a cumulative brightness distribution curve can be set for each input image signal and then printing can be performed. The gamma-correction processing can be suitably modified in accordance with the input image signal.

In the above embodiment, the cumulative brightness distribution curve is commonly used for the R, G and B data. Therefore, an output image with an excellent gray level quality over the entire image area can be obtained with a good color balance.

An upper and/or lower extremity for input data is set in accordance with the cumulative brightness distribution, and data obtained by normalization according to the set extremity can be used.

An example of an apparatus for calculating the brightness distribution and cumulative brightness distribution in the first embodiment of the present invention will be described with reference to FIGS. 4 to 7.

Figure 4:
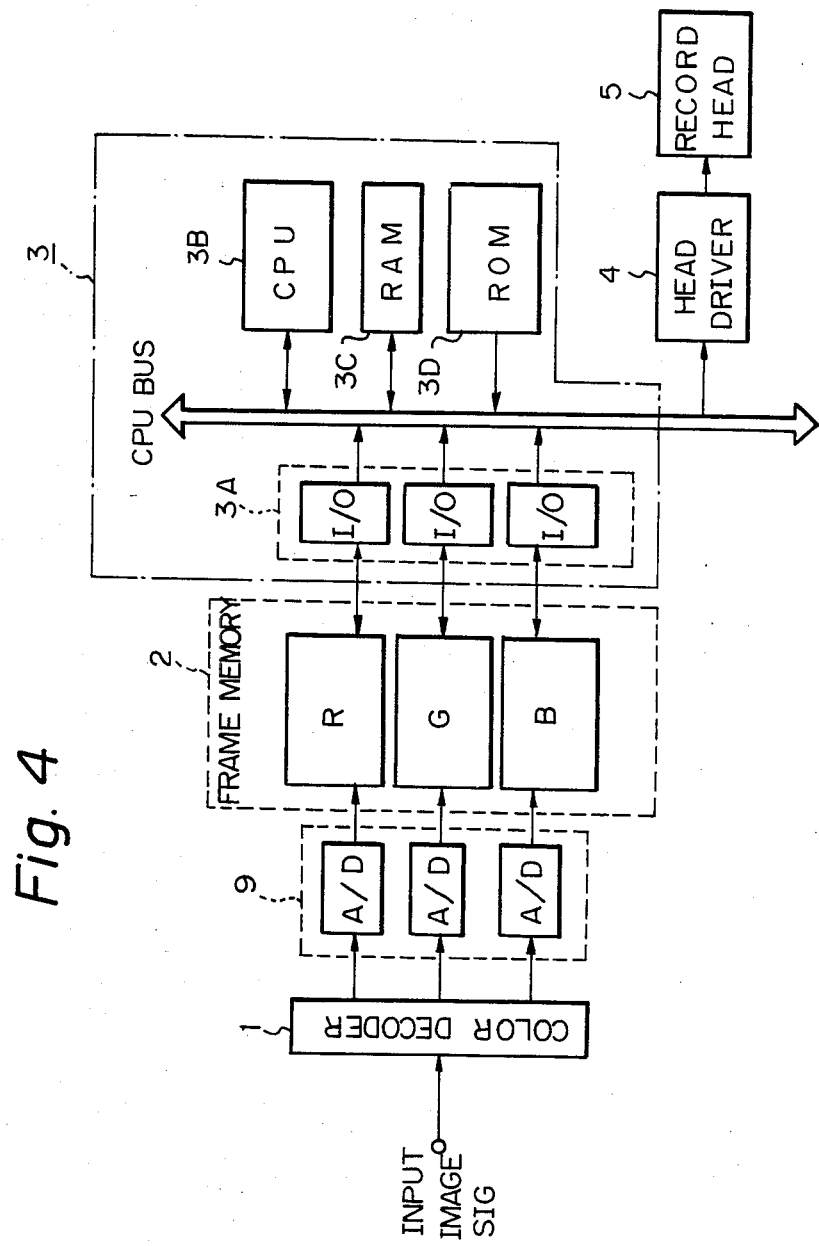
FIG. 4 is a block diagram of an apparatus for calculating a brightness distribution and a cumulative brightness distribution according to the first embodiment of the present invention.

FIG. 4 shows an example of the apparatus for calculating the brightness distribution and cumulative brightness distribution according to the first embodiment of the present invention. FIG. 4 shows details of the image process circuit 3. A CPU for performing operation processing such as multiplication, addition and table conversion. and other devices associated with the CPU such as a ROM or RAM can be incorporated in the image process circuit 3. These devices may alternatively be included in the system controller 6 to control the operation of the image process circuit 3. However, in the following description, it is assumed that these devices including the CPU are incorporated in the image process circuit 3.

Referring to FIG. 4, an input color image signal is separated into the R, G and B primary signals by the color decoder 1. The R, G and B signals are converted into 8-bit data (0 to 255 levels) by A/D converters 9 and are stored in units of frames each consisting of 480 (vertical)×640 (horizontal) pixels in the frame memory 2. The data in the frame memory 2 is connected to a CPU 3B through parallel I/O ports 3A. The pixel data in the frame memory 2 can be freely read out or written by addressing with an address (x, y). The data in the frame memory 2 is represented by R data (x, y), G data (x, y) and B data (x, y) for the R, G and B components. Note that x and y in these data represent the x- and y-coordinates in the x-y coordinate plane and x=1 to 640 and y=1 to 480. A RAM 3C stores frequency distribution data of a brightness level and normalized cumulative frequency distribution data. A ROM 3D stores a program or the like. The head driver 4 can be one same as that shown in FIG. 3. D/A converters and amplifiers for applying voltages to the printing head 5 are arranged in the head driver 4 for each of the Y, M, C and BK signals.

Figure 5:
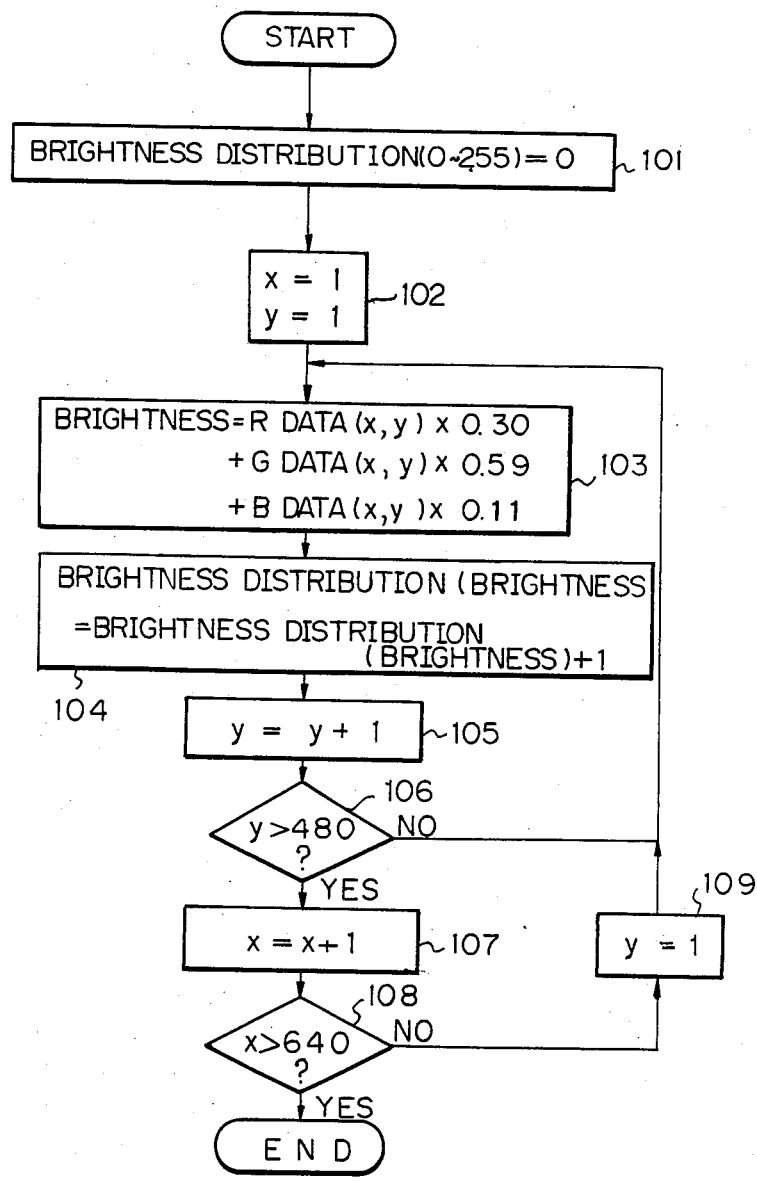
FIGS. 5 and 6 are flow charts for calculating the brightness distribution and cumulative brightness distribution in the apparatus shown in FIG. 4.

Referring to FIG. 5, the flow of calculating the brightness distribution for one frame is explained. Referring to FIG. 5, the brightness distribution (0 to 255 levels) indicates the frequency of the A/D converted brightness level (0 to 255 levels). This data is stored in the RAM 3C in FIG. 4. In step 101, a data area storing data representing the frequency is cleared. In step 102, the loop count along x- and y-directions over the entire area of the screen is initialized. In step 103, the brightness level is calculated by the equations illustrated in the block of step 103 in accordance with the R, G and B signals. In step 104, the brightness distribution is incremented by 1. In step 105, the loop count along the y-direction is executed. When it is determined in step 106 that y>480, the loop count along the x-direction is executed in step 107. When it is determined in step 108 that x>640, processing for calculating the brightness distribution for one frame is ended. In step 109, the loop count along the y-direction is initialized.

Figure 6:
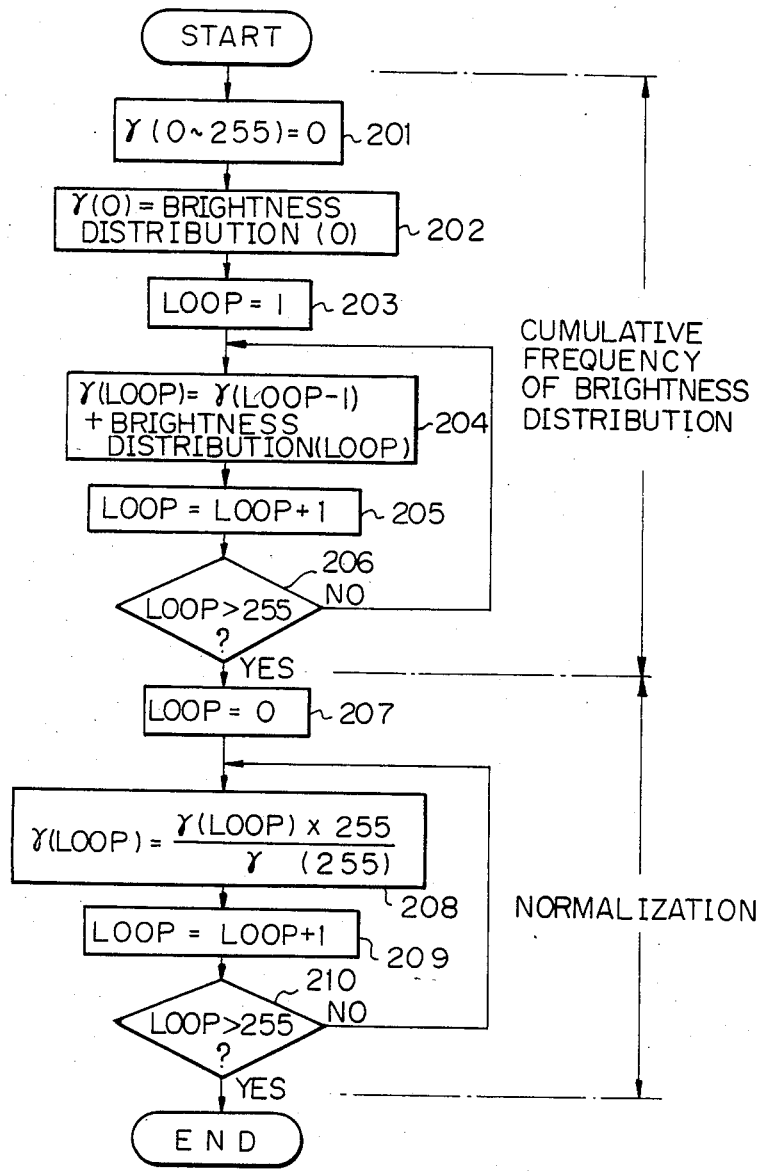

FIG. 6 shows a flow chart for calculating the cumulative brightness distribution curve from the data of the brightness distribution obtained in the processing described above. In the present invention, as described above, the cumulative brightness distribution curve calculated in the processing shown in FIG. 6 is used as a gamma-correction curve. Referring to FIG. 6, in steps 201 to 206, the cumulative frequency gamma (0 to 255 levels) of the brightness distribution is calculated. In steps 207 to 210, the value of the cumulative frequency gamma is normalized to one of 0 to 255 levels. The gamma (255) represents the total cumulative frequency and is 640×480 for the number of pixels described above. The value of the normalized gamma (0 to 255 levels) is stored in the RAM 3C as a table (see step 208). Then, gamma conversion can be performed by table conversion such that output=gamma (input). Note that the input herein means data (0 to 255 levels) in the frame memory 2 while the output means the normalized value (0 to 255 levels). In this embodiment, the gamma correction is performed by performing this conversion commonly for the R, G and B primaries.

Referring again to FIG. 6, in step 201, the data area of the RAM 3C which stores the cumulative frequency gamma (0 to 255 levels) is cleared. In step 202, the cumulative frequency distribution is initialized, that is, a frequency corresponding to the brightness distribution of 0 is set. In step 203, the loop count is initialized. In step 204, the brightness distribution (frequency of the occurrence of the brightness level) at the current loop is added to the cumulative frequency for the immediately preceding loop, that is, the gamma (loop). In step 205, the loop count is incremented by one. The above steps are repeated until the loop >255 is established (step 206).

The normalization is performed in the following manner. In step 207, the loop count is initialized. In step 208, calculation for normalization is performed. In step 209, the loop count is incremented by one. The above steps are repeated until the loop >255 is obtained (step 210).

Figure 7:
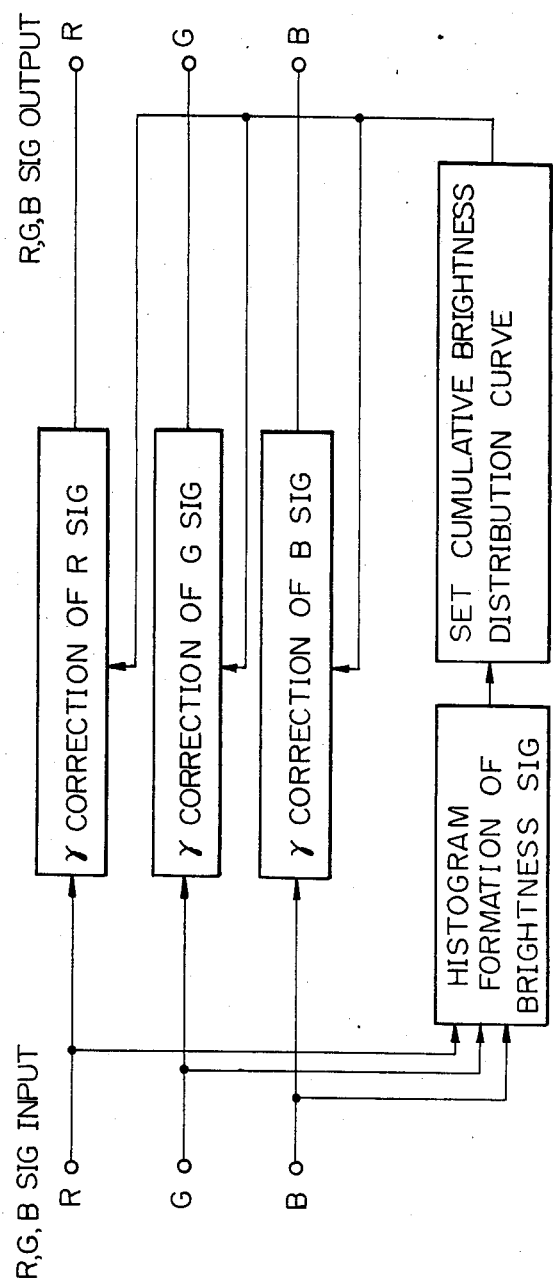
FIG. 7 is a functional block diagram for explaining the function of the first embodiment of the present invention.

FIG. 7 shows the functional block diagram of an apparatus for calculating the brightness distribution and the cumulative brightness distribution according to the embodiment described above with reference to FIGS. 4 to 6.

In the first embodiment described above, a histogram of the brightness level of the input image signal is prepared. Common gamma correction for the R, G and B primary signals is performed in accordance with the cumulative brightness distribution curve as a cumulative curve of the histogram. However, the present invention is similarly applicable to the case wherein a histogram is prepared for any one color (e.g., R signal) or any two colors (e.g., R and G signals), and gamma correction is commonly performed for each primary or for one or two colors selected in accordance with the cumulative brightness distribution curves obtained by accumulating the histogram. When the present invention is applied to a black-and-white printer, the same processing as described above can be performed if a brightness signal as an input signal is recorded on a recording medium such as a frame memory.

As described in detail above, according to the first embodiment of the present invention, a histogram of a brightness level of an input signal is calculated, and a cumulative brightness distribution curve of the histogram is calculated. Gamma correction is performed using this cumulative brightness distribution curve as a gamma-correction curve. Then, a gray level quality can be given to an image portion having a large amount of information. The gray level of an image portion which has a high frequency of occurrence in the brightness level frequency distribution is increased, and the gray level of an image portion which has a low frequency is decreased. Therefore, in a dark image, an effect similar to that obtainable with an increase in the gray level of a shadow portion can be obtained. In the case of a bright image, an effect similar to that obtainable with an increase in a highlight portion can be obtained, thereby providing an output image having a good gray level quality.

The apparatus of the present invention can perform automatic and consistent gamma correction with respect to the input image signal and can produce an output image with a good gray level quality without error and without the need for an experienced operator.

Second Embodiment of Image Signal Processing Apparatus (FIG. 8)

Figure 8A:
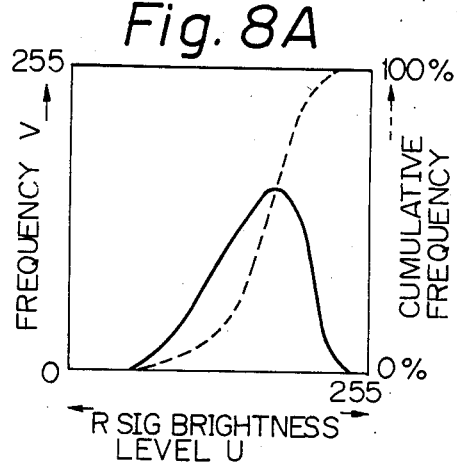
FIGS. 8A, 8B and 8C are graphs showing histograms of brightness level and their cumulative curves for each of three primaries.
Figure 8B:
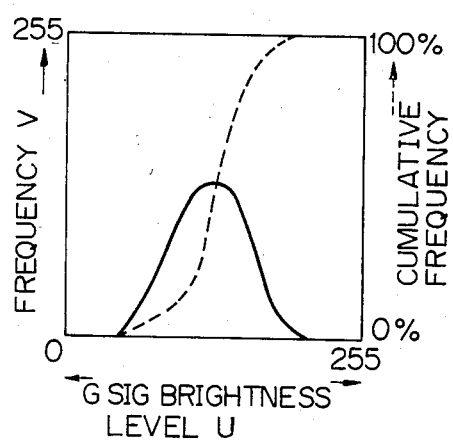
Figure 8C:
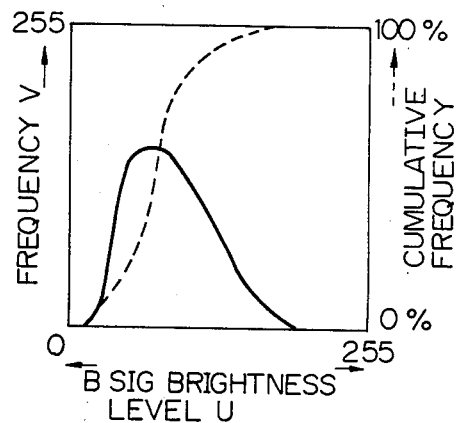

FIGS. 8A, 8B and 8C show the histograms of brightness level (solid lines) and their cumulative curves (dotted lines) for each of the primary signals R, G and B obtained by method of subtractive mixture of colors. In this case, the brightness level is digitized into 0 to 255 levels, and the frequency distribution is digitized into 0 to 255 levels. The cumulative frequency is expressed as a percentage. As may be apparent from these drawings, in a region where the frequency is high, the cumulative curve is steep. In a region where the frequency is lows, the slope of the cumulative curve is moderate. According to the present invention, this property is utilized and the cumulative curve is used as the gamma correction curve for each primary.

The image signal processing apparatus according to the second embodiment of the present invention has the same configuration as that of the embodiment shown in FIGS. 3 and 4.

Figure 9:
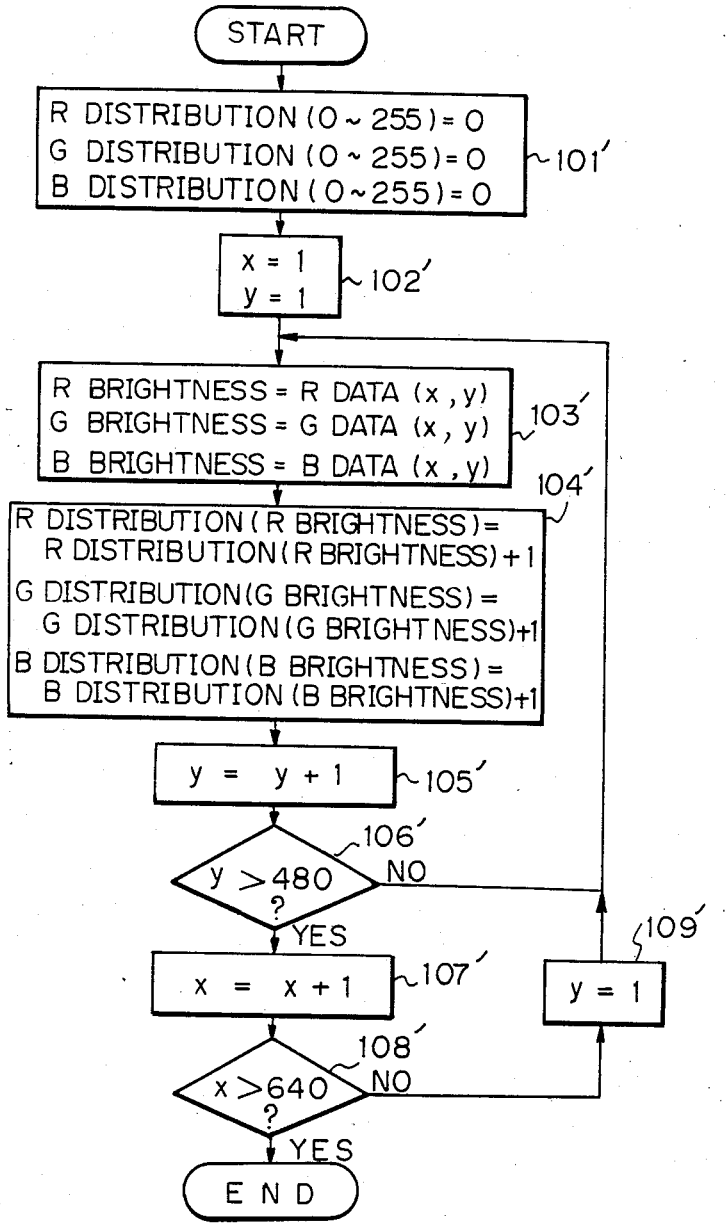
FIG. 9 is a flow chart for calculating the brightness distribution for each of the three primaries.

Referring to FIG. 9, the flow for calculating the brightness distribution for each of R, G and B signals for one frame will be described below. In FIG. 9, R, G and B distributions (0 to 255 levels) indicate the frequencies of each A/D converted brightness level (0 to 255 levels). The data on these frequencies is stored in the RAM 3C. In step 101', the data area storing data representing the frequency is cleared. In step 102', the loop count in the x- and y-directions on the entire screen is initialized. In step 103', the brightness level for each of R, G and B signals is calculated. In step 104', the frequencies of the R, G and B signals are incremented by 1, respectively. In step 105', the loop count in the y-direction is performed. When it is determined in step 106' that y>480, the loop count in the x-direction is executed in step 107'. When it is determined in step 108' that x>640, the processing for calculating the brightness distribution for one frame is ended. In step 109', the loop count in the y-direction is initialized.

The flow for calculating the cumulative brightness distribution curves for the R, G and B distributions calculated in the processing of the flow shown in FIG. 9 is the same as that shown in FIG. 6. In this embodiment, as described above, processing shown in FIG. 6 is performed for each R, G or B color signal, and the cumulative brightness distribution curves for the respective R, G and B signals are used as gamma correction curves for the respective color signals.

Figure 10:
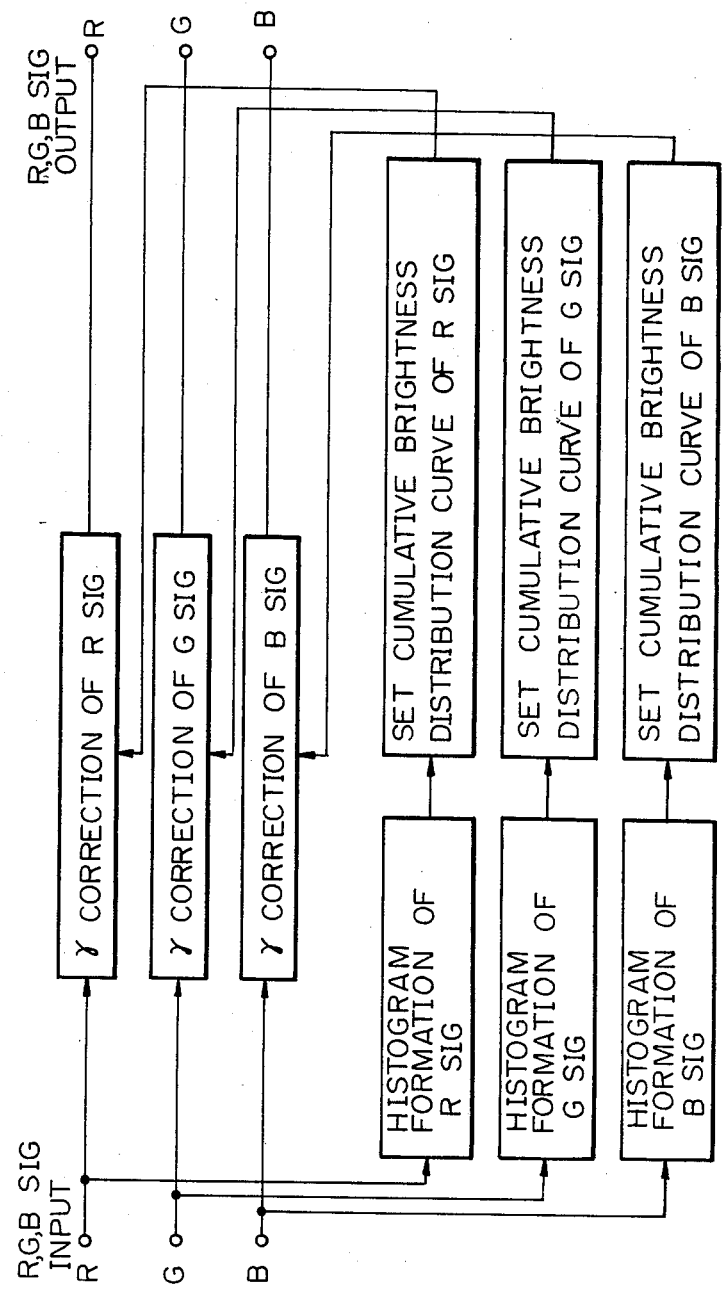
FIG. 10 is a functional block diagram for explaining the function of an image processing apparatus according to a second embodiment of the present invention.

FIG. 10 shows the functional block diagram of an apparatus for calculating the brightness distribution and the cumulative brightness distribution according to the embodiment shown in FIGS. 8 and 9.

As described above, according to the second embodiment, a histogram of brightness level for each primary signal is calculated, and a cumulative brightness distribution curve of this histogram is calculated. The calculated cumulative brightness distribution curve is used as a gamma-correction curve. Therefore, an image with a good gray level quality at a portion with a large amount of information can be obtained. In addition, the gray level of an image portion having a high frequency in the brightness level frequency distribution for each of R, G and B primary signals is increased, and the gray level of an image portion having a low frequency can be decreased. In the case of a dark image, an effect obtainable with an increase in the gray level of a shadow portion is obtained. In the case of a bright image, an effect obtainable with an increase in a highlight portion can be obtained, thereby providing an output image with an excellent gray level quality for each primary.

Moreover, the apparatus of the second embodiment can perform automatic and consistent gamma correction for any type of input image signal, and can provide an output image with a good gray level quality without error or need for an experienced operator.

When gamma correction characteristics are preset for each of R, G and B primary signals, the gray level range for each color can be widened. For example, in an image of a sunset scene wherein the red component is stressed, the red component can be automatically weakened. In this manner, for an input image with a color imbalance, the color balance can be automatically corrected. Third Embodiment of Image Signal Processing Apparatus In the first and second embodiments, gamma correction curves are set. However, in this embodiment, an upper extremity and a lower extremity for an input signal are preset, and the input signal is normalized within the range between the upper and lower extremities. This embodiment can be realized with the configuration shown in FIGS. 3 and 4.

Processing for setting upper and lower extremities for an input signal in the apparatus shown in FIG. 3 will be described with reference to FIGS. 11A to 11C and 12A to 12C. That is, each input image signal is separated into R, G and B signals by the color decoder 1 and converted into 0 to 255 level digital data which is stored in the frame memory 2. when R=G=B=255, it indicates white. The larger the value of each color signal, the brighter the corresponding color component. A brightness signal $Y_0$ of the input image signal is given by, for example:

$$Y_0 = 0.30R + 0.59G + 0.11B$$

Figure 12A:
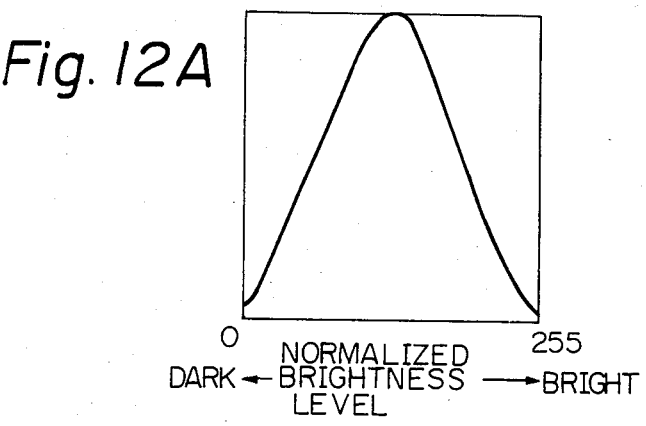
FIGS. 12A, 12B and 12C are graphs showing brightness distributions when the input levels of the input signals shown in FIGS. 11A, 11B and 11C are normalized.
Figure 12B:
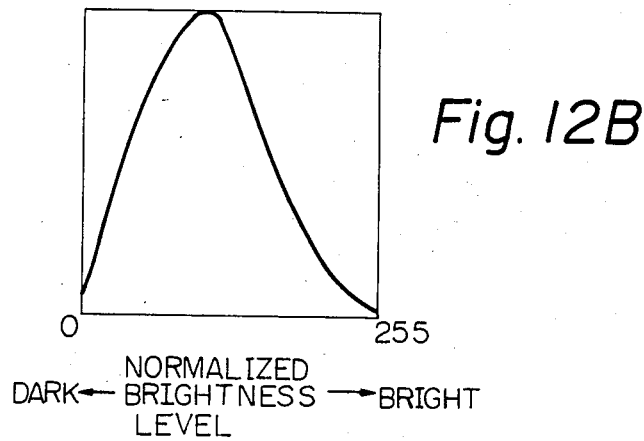
Figure 12C:
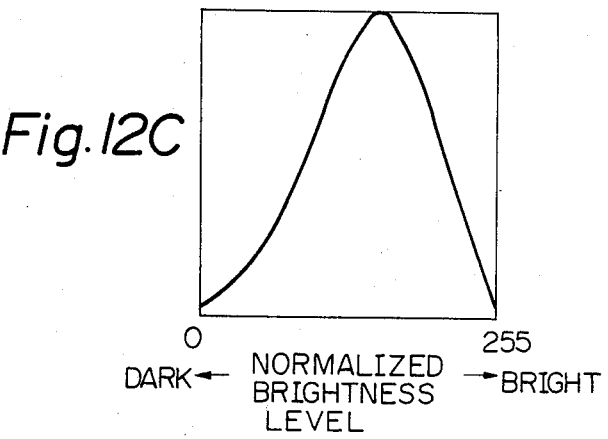

When the brightness over the entire region of one frame of an image to be recorded, e.g., 640×480 dots in the case of an NTSC signal is calculated, solid curves shown in FIGS. 11A to 11C are obtained. Note that FIGS. 11A, 11B and 11C represent cases wherein the brightness distribution is deviated to a halftone portion, a dark portion and a bright portion, respectively. When cumulative brightness distributions are obtained by accumulating the respective brightness distributions from a dark image portion, respectively, curves indicated by dotted lines in FIGS. 11A to 11C are obtained. Referring to FIGS. 11A to 11C, the upper and lower extremities along the abscissa indicate 1% and 99% of the total cumulative frequency value, respectively. FIGS. 12A to 12C respectively indicate the curves obtained by normalizing the brightness curves shown in FIGS. 11A to 11C into 0 to 255 levels within the range between the above-mentioned upper and lower extremities. Although the brightness distributions for each of the R, G and B signals are normalized in the manner described above, the brightness distribution is normalized only for the brightness signal herein for the sake of simplicity.

As may be apparent from a comparison between FIGS. 11A and 12A, when an image having a brightness distribution which is deviated toward a halftone portion is normalized, the image is converted into one of a good apparent gray level quality. Similarly, when an image having a brightness distribution which is deviated toward a dark portion as shown in FIG. 11B is normalized, the image having a wider brightness distribution and having a good gray level quality as shown in FIG. 12B is obtained. Finally, when an image having a brightness distribution which is deviated toward a bright portion as shown in FIG. 11C is normalized, an image having a good gray level quality as shown in FIG. 12C is obtained.

When the lower extremity as described above is 5% or more, the dark portion becomes solid. However, when the upper extremity is 95% or less, the bright portion becomes blank. In view of this, the upper and lower extremities of the cumulative brightness distribution curve are preferably determined to be about 99 to 97% and about 1 to 3%, respectively.

The method of setting the upper and lower extremities will be described below. The brightness distribution is calculated in accordance with the same procedures as the flow shown in FIG. 5.

Figure 13A:
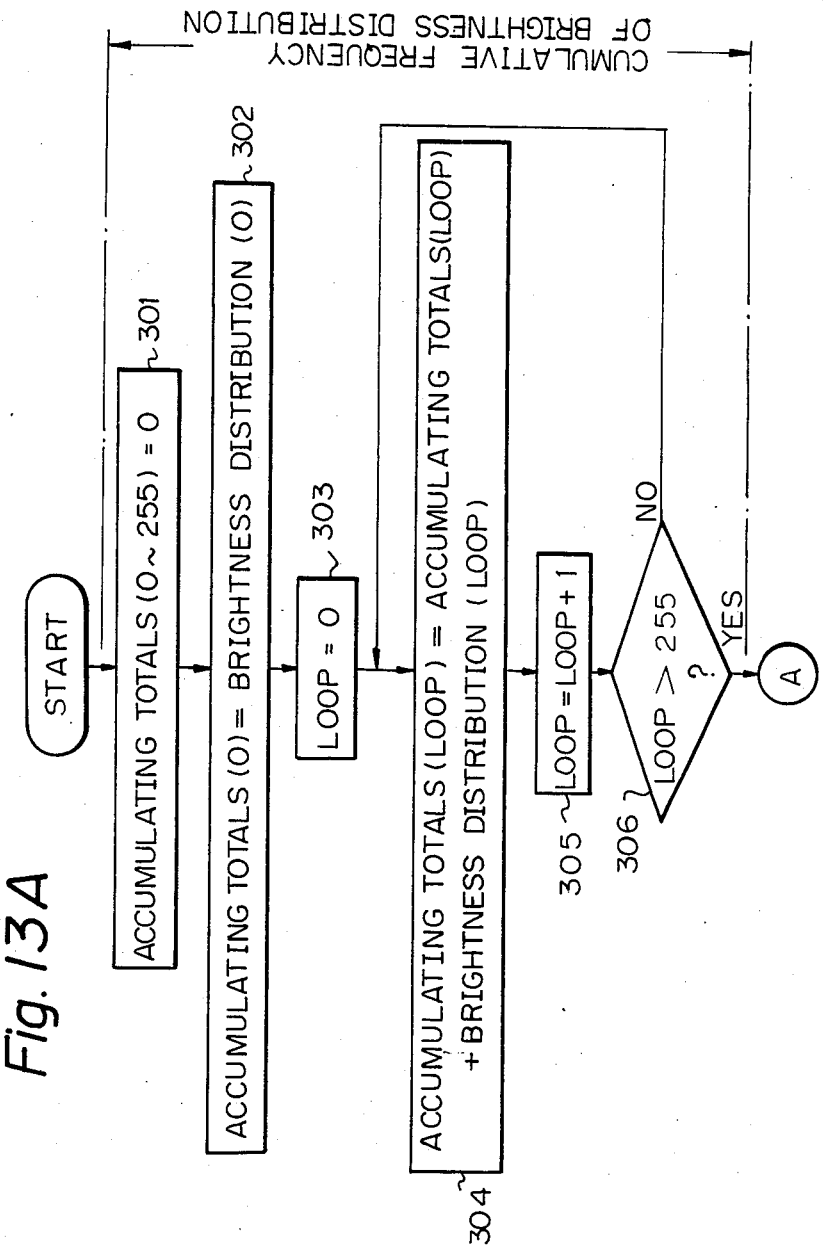
FIGS. 13A and 13B are flow charts for processing to set upper and lower extremities of an input image signal in accordance with a cumulative brightness distribution.
Figure 13B:
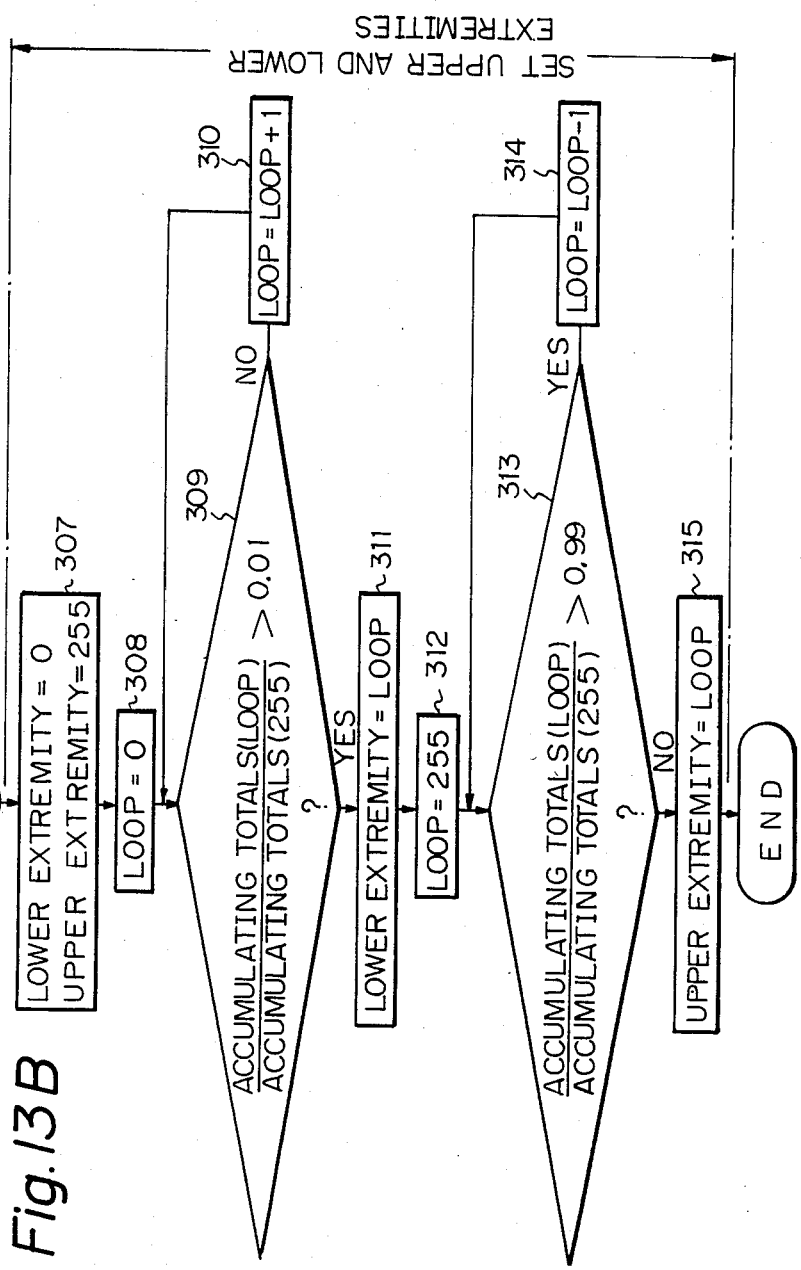

FIGS. 13A and 13B are flow charts which together illustrate a procedure for calculating an upper extremity and a lower extremity for an input signal from the brightness distribution determined in the above processing. Referring to FIGS. 13A and 13B, in steps 301 to 306, the cumulative frequency of the brightness distribution, that is, the cumulative value (0 to 255) is calculated. In steps 307 to 315, the upper and lower extremities of the input signal are calculated. Note that 255 in this case represents the total cumulative frequency and is 640×480 for the number of pixels described above. The upper and lower extremities are set to be smaller than 1% and larger than 99%, respectively, of the total cumulative frequency of the brightness distribution. More specifically, the lower extremity is calculated by searching from the lower level of the cumulative value (loop) for a brightness level at which the value becomes 1% or more of the total cumulative frequency. Similarly, the upper extremity is calculated by searching from the upper level of the cumulative value (loop) for a brightness level at which the value becomes 99% or less of the total cumulative frequency. In this embodiment, the upper and lower extremities obtained in the above processing will be used as common upper and lower extremities for R, G and B signals.

Referring again to FIG. 13A, in step 301, the data area of the RAM 3C which is storing the cumulative value (0 to 255 levels) is cleared. In step 302, the cumulative frequency distribution is initialized; the frequency of brightness 0 is set. In step 303, the loop count is initialized. In step 304, the brightness distribution (frequency of occurrence of the corresponding brightness level) in the current loop is added to the cumulative value or frequency (loop), i.e., the cumulative frequency for the immediately preceding loop. In step 305, the loop count is incremented by 1. The above processing is repeated until the loop >255 (step 306) is obtained.

In order to calculate the upper and lower extremities, the upper and lower extremities are initialized in step 307 (FIG. 13B). The loop count for calculating the lower extremity is initialized in step 308. In steps 309 and 310, the following calculation is performed:

cumulative value (loop)/cumulative value (255)

When the calculated value is smaller than 0.01, the loop count is incremented in unitary increments. The above operation is repeated. When the calculated value becomes 0.01 or more, the immediately preceding loop count is set as a lower extremity (step 311). In step 312, the loop count for calculating the upper extremity is initialized. In steps 313 and 314, the operation as described above is repeated until the calculated value is larger than 0.99. When the calculated value becomes 0.99 or less, the immediately preceding loop count is set as an upper extremity (step 315).

In order to normalize the input image signal in accordance with the upper and lower extremities as described above, it can be performed in accordance with the following:

[(x—lower extremity)/(upper extremity—lower extremity)]×255 where x is the data (0 to 255 levels) in the frame memory 2 (FIGS. 3 and 4) and normalized into 0 to 255 levels. When this processing is performed for each primary, normalization for each primary signal is performed.

The image process circuit 3 shown in FIG. 3 has the following functions as described above. More specifically, steps 301 to 306 of FIG. 13 are performed to calculate the cumulative brightness distribution curve for each primary signal of an input signal which is normalized within a range between the upper and lower extremities determined in the manner described above. Then, gamma correction for each primary is performed using these cumulative brightness distribution curves as gamma correction curves. In this manner, an image portion having a large amount of information can be reproduced with a good gray level quality. An image portion having a high frequency in the frequency distribution in the brightness level is automatically increased, and an image portion having a low frequency is automatically decreased. In the case of a dark image, an effect similar to that obtainable with an increase in the gray level in a shadow portion is obtained. In the case of a bright image, an effect obtainable with an increase in the gray level of a highlight portion can be obtained. As a result, a reproduced image with an excellent overall gray level quality can be obtained.

Figure 14:
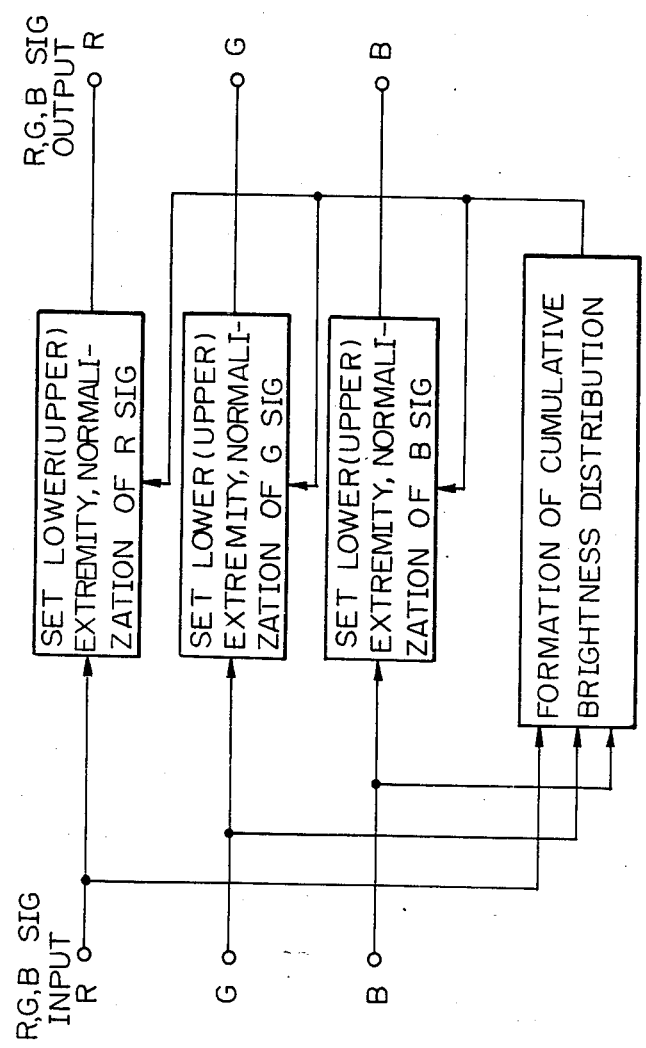
FIG. 14 is a functional block diagram for explaining the function of an image processing apparatus according to a third embodiment of the present invention.

FIG. 14 is a functional block diagram of an apparatus for calculating the upper and/or lower extremity of an input signal in the third embodiment of the present invention. In FIG. 14, the upper and/or lower extremity means one or both of the upper and lower extremities.

In the above embodiment, the cumulative brightness distribution curve is calculated for each primary signal. The upper and lower extremities for each R, G and B primary signals are set, and normalization of the input signal is performed within the range between the upper and lower extremities. However, as may be apparent from the above description, the present invention may be similarly applicable to a case wherein only one of the upper and lower extremities is set, and normalization is performed using the selected upper or lower extremity as a limit. Furthermore, the upper and/or lower extremity can be used not only for normalization of the R, G and B signals but also for normalization of Y, M and C signals.

Likewise, the present invention can be applied to a case wherein the cumulative brightness distribution is calculated for any one color (e.g., the R signal) or any two colors (e.g., the R and G signals) in an input image signal instead of calculating the cumulative brightness distribution for the brightness signal, the upper and/or lower extremity is calculated for the selected one or two colors, and normalization is performed in accordance with the upper and/or lower extremity calculated in this manner.

In order to process a monochromatic image signal, similar processing to that described above can be obtained if a brightness signal as an input signal is stored in a recording medium such as a frame memory.

Figure 15:
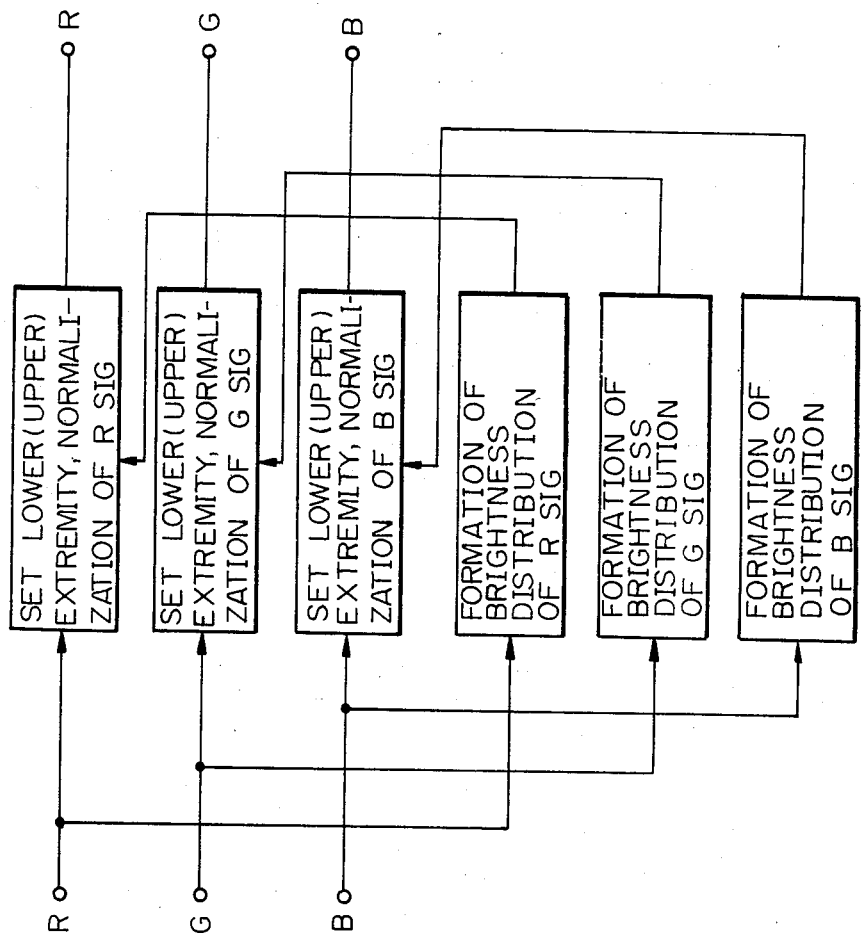
FIG. 15 is a functional block diagram for explaining the function of an image processing apparatus according to a fourth embodiment of the present invention.

As described in detail above, according to the present invention, the cumulative brightness distribution is calculated for an input signal, and one or both of the upper and lower extremities are set for the input signal in accordance with the calculated cumulative brightness distribution. Therefore, when the input image signal is normalized, the upper and/or lower extremity can be automatically and consistently set for any type of input signal. For this reason, normalization can be properly performed without relying on the experience and skill of the operator, and an image of good gray level quality can be obtained for either of a monochromatic image or a color image. Fourth Embodiment of Image Signal Processing Apparatus In this embodiment, as shown in the functional block diagram in FIG. 15, brightness distributions for each of R, G and B signals are prepared, and upper and/or lower extremity for the respective color signals is set, and normalization is performed according to the upper and/or lower extremity determined in this manner.

In the fourth embodiment, the configuration shown in FIGS. 3 and 4 can also be adopted. In the processing method of this embodiment, the brightness distributions for the respective color signals are calculated in accordance with the flow chart shown in FIG. 9, and processing shown in FIG. 13 is performed for each of the color signals to determine the upper and/or lower extremity for each of the color signals. A detailed description of this process will not be repeated.

The processing for setting the upper and lower extremities for each input color signal in the apparatus shown in FIG. 3 will be described referring to FIGS. 16 and 17. More specifically, the input image signal is separated into R, G and B signals by the color decoder 1. The color signals are converted into digital data of 0 to 255 levels, which is stored in the frame memory 2. When R=G=B=255, it indicates white. The larger the value of each color signal, the brighter the corresponding image. When the distributions of the brightness level are calculated for one frame of an image to be recorded for each of the R, G and B signals, for example, for 640×480 dots for an NTSC signal, solid curves as shown in FIGS. 16A, 16B and 16C are obtained. When the cumulative brightness distributions are obtained from these curves from their dark side, dotted curves as shown in FIGS. 16A, 16B and 16C are obtained. In FIGS. 16A, 16B and 16C, the upper and lower extremities on the abscissa indicate values of 1% and 99% of the total cumulative frequency.

Figure 16A:
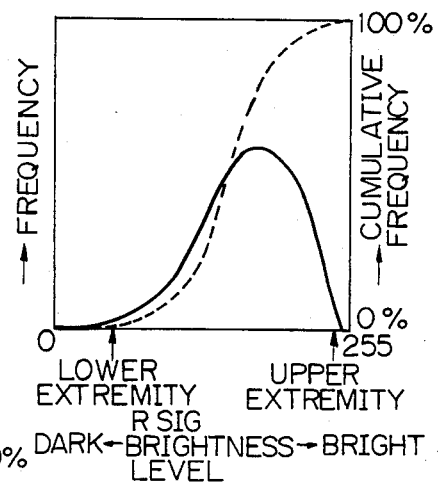
FIGS. 16A, 16B and 16C are graphs showing brightness distributions and their cumulative curves for each of the three primaries.
Figure 16B:
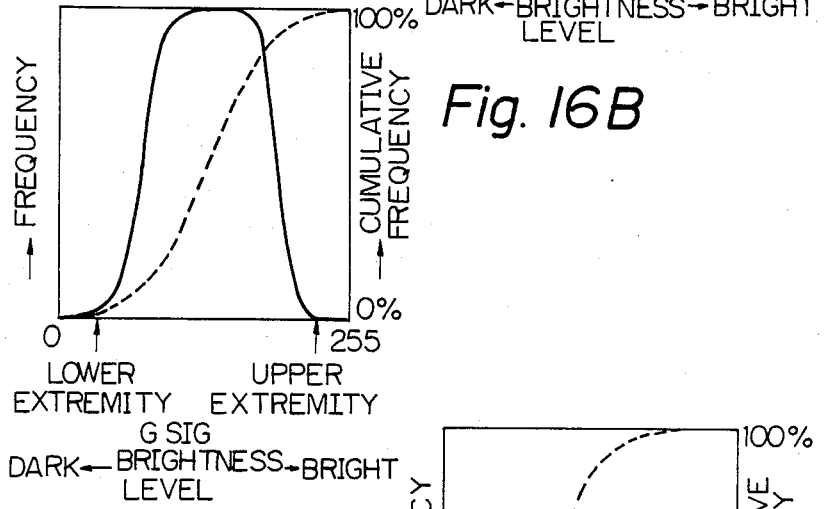
Figure 16C:
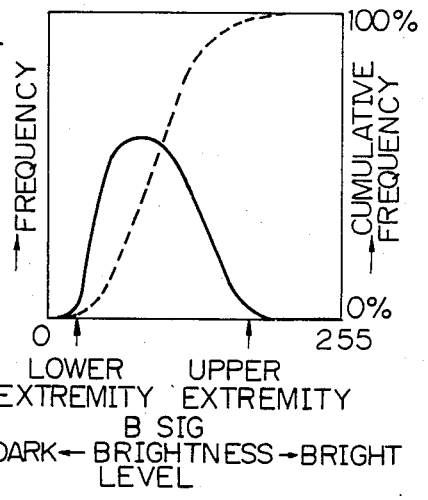
Figure 17A:
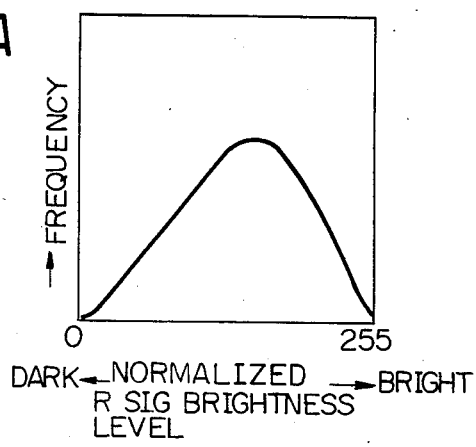
FIGS. 17A, 17B and 17C are graphs showing brightness distributions when the input level is normalized for each of the three primaries.
Figure 17B:
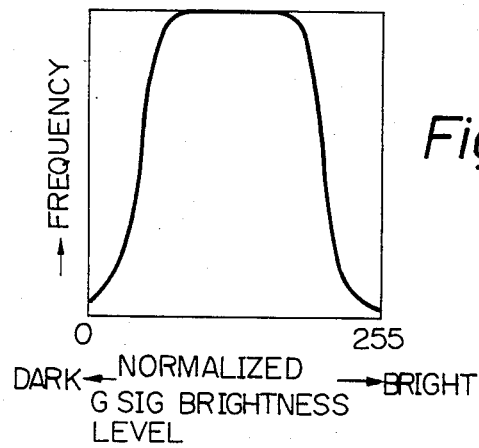
Figure 17C:
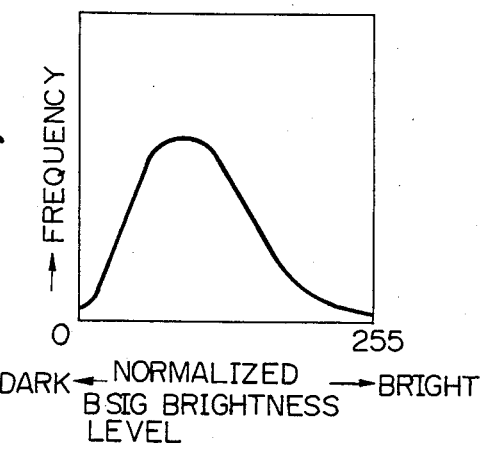

FIGS. 17A, 17B and 17C show curves obtained by normalizing the brightness distributions shown in FIGS. 16A, 16B and 16C into 0 to 255 levels within the range between the upper and lower extremities described above. As can be seen from a comparison between FIGS. 16A to 16C and FIGS. 17A to 17C, the brightness distribution of each of R, G and B colors is expanded by normalizing within the above-mentioned range. As a result, a printed image can have a good contrast.

When the lower extremity is set to be a value 5% or more, a dark image portion becomes solid. When the upper extremity is set to be a value 95% or less, a bright image portion becomes blank. In view of this, in practice, the upper and lower extremities are preferably set to be about 99 to 97% and about 1 to 3%, respectively.

According to the fourth embodiment as described above, the cumulative brightness distribution is calculated for each primary. One or both of extremities are determined for each primary in accordance with the cumulative brightness distributions. Therefore, when an input image signal is normalized, the upper and/or lower extremity can be automatically and consistently set for any type of input signal. Normalization can therefore be performed without requiring a skilled and experienced operator.

Since the upper and/or lower extremity is determined for each primary signal, normalization for one color does not affect normalization of other colors and expression of good gray level quality for each color component can be performed. Especially with an input image with a stressed red component such as a sunset scene, the signal of R color component is strong, that is, deviated to the bright side. Therefore, normalization for the red color component is performed more strongly than that for the remaining color components. Therefore, a printed image has a weakened R red component, providing a natural image quality. In this manner, the apparatus of the fourth embodiment of the present invention can perform automatic color balance correction for an input image with a color imbalance.

As has been described in detail hereinabove, in an image signal processing apparatus according to the present invention, an input image signal can be automatically processed in accordance with the characteristics of the input image signal. Therefore, signal correction can be performed without relying on the experience and skill of the operator.

The present invention is not limited to the first to fourth embodiments described above, and various changes and modifications can be made within the spirit and scope of the present invention.

What we claim is:

1. An image signal processing apparatus comprising:
   means for preparing a histogram to obtain a frequency of occurrence of each of a plurality of brightness levels of an input image signal;
   means for computing, for each brightness level, the sum of the frequency of occurrence of the portion of said plurality of brightness levels between said brightness level and a predetermined brightness level;
   memory means for storing a value corresponding to said sum of each brightness level,
   wherein the brightness level of the input image signal is used as an address of said memory means and a gamma correction is performed by using as an output value, said value corresponding to said sum, said value being obtained from said memory means.

2. An apparatus according to claim 1, wherein the input image signal comprises three color signals, and further comprising means for obtaining a brightness signal obtained by mixing the three color signals, said histogram preparing means preparing a histogram of the brightness signal.

3. An apparatus according to claim 1, further comprising storage means for storing at least one frame of the input image signal.

4. An apparatus according to claim 1, wherein the input image signal includes color signals of red, green, and blue.

5. An apparatus according to claim 1, wherein said input image signal includes a plurality of color signals, and said histogram and said sum are obtained for each of said color signals.

6. An image signal processing apparatus, comprising:
   means for preparing a histogram to obtain a frequency of occurrence of each of a plurality of brightness levels of an input image signal;
   means for computing, for each brightness level, the sum of the frequency of occurrence of the portion of said plurality of brightness levels between said brightness level and a predetermined brightness level;
   means for setting in response to said sum an upper limit brightness level and a lower limit brightness level of the input image signal; and
   memory means for storing a value corresponding to said sum of each brightness level,
   wherein the brightness level of the input image signal is used as an address of said memory means, and a gamma correction is performed by using, as an output value, the value corresponding to said sum obtained from said memory means.

7. An apparatus according to claim 6, wherein the input image signal comprises three color signals, and further comprising means for obtaining a brightness signal obtained by mixing the three color signals, said histogram preparing means preparing a histogram of the brightness signal.

8. An apparatus according to claim 6, further comprising storage means for storing at least one frame of the input image signal.

9. An apparatus according to claim 6, wherein said memory means outputs a first predetermined output value as said sum for each of the input brightness levels below said lower limit value.

10. An apparatus according to claim 6, wherein said memory means outputs a second predetermined output value as said sum for each all of the input brightness levels, above said upper limit value.

11. An apparatus according to claim 6, wherein said input image signal includes a plurality of color signals, and said histogram and said sum are obtained for each of said color signals.

* * * * *

UNITED STATES PATENT AND TRADEMARK OFFICE
CERTIFICATE OF CORRECTION

PATENT NO. : 4,667,228
DATED : May 19, 1987
INVENTOR(S) : HIDEAKI KAWAMURA, ET AL.

It is certified that error appears in the above-identified patent and that said Letters Patent is hereby corrected as shown below:

COLUMN 4

Line 53, "conversion." should read --conversion--.

COLUMN 7

Line 67, "rected.  Third" should read --rected.  ¶ Third--.

COLUMN 8

Line 14, "when" should read --When--.

COLUMN 10

Line 67, "image.  Fourth" should read --image.  ¶ Fourth--.

COLUMN 12

Line 34, "using" should read --using,
    Line 62, "setting" should read --setting,--.
    Line 62, "sum" should read --sum,--.

UNITED STATES PATENT AND TRADEMARK OFFICE
CERTIFICATE OF CORRECTION

PATENT NO. : 4,667,228

DATED : May 19, 1987

INVENTOR(S) : HIDEAKI KAWAMURA, ET AL.

It is certified that error appears in the above-identified patent and that said Letters Patent is hereby corrected as shown below:

COLUMN 14

Line 7, "all" should be deleted.
    Line 8, "levels," should read --levels--.

Signed and Sealed this

Fourth Day of April, 1989

Attest:

DONALD J. QUIGG

Attesting Officer

Commissioner of Patents and Trademarks